United States Patent Office 3,573,106
Patented Mar. 30, 1971

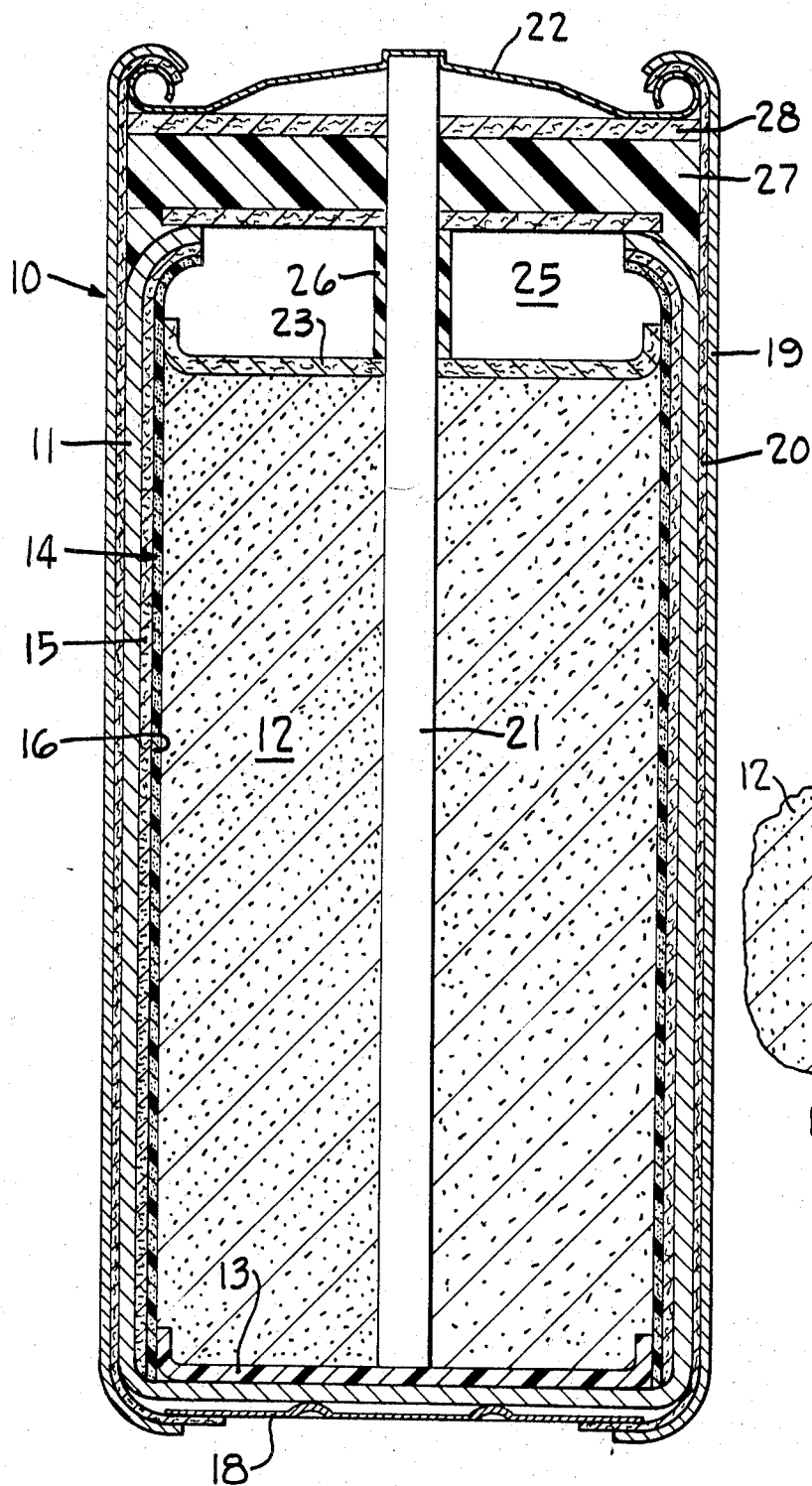
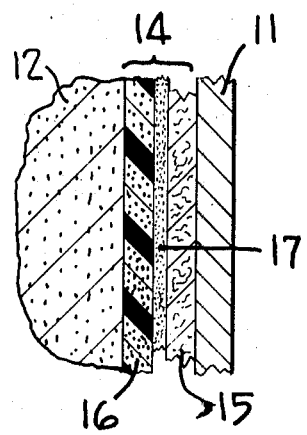

3,573,106
ELECTRIC BATTERY HAVING A LAMINATED SEMIPERMEABLE BARRIER/ABSORBENT SEPARATOR
Martin H. Johnson, Verona, and Duane M. Larsen and Carrol G. Saxe, Madison, Wis., assignors to ESB Incorporated
Filed Nov. 1, 1968, Ser. No. 772,776
Int. Cl. H01m 3/02
U.S. Cl. 136—131
11 Claims

ABSTRACT OF THE DISCLOSURE

An electric battery having a laminated semipermeable barrier/absorbent separator to provide improved cycle life and/or improved high temperature and long duration storage capability. The battery employs a cathode material which is appreciably soluble in the electrolyte, and the separator is positioned in such a manner that the semipermeable barrier (e.g. cellophane) is in contact with the cathode material and the absorbent material is in contact with the anode. The absorbent material is specially prepared from a vinyl acetate-ethylene copolymer binder material blended with a gelling agent (e.g. starch and flour). The barrier material prevents cathode active material from migrating to the anode, and the absorbent material absorbs the battery electrolyte and immobilizes it in contact with the anode surface.

BACKGROUND OF THE INVENTION

In the electric battery art, many types of material and combinations of material have been used as separators interposed between the positive (cathode) and negative (anode) electrodes. In secondary batteries, it has been found that the separator may be a critical factor in determining the battery cycling capability. The separator material is particularly critical in batteries which utilize cathode materials that are appreciably soluble in the battery electrolyte solution. Some secondary battery systems employ cathode active materials which vary in solubility depending on whether the cathode material is in the charged (oxidized) state or discharged (reduced) state, and the separator is an important element in these systems.

The problem caused by cathode materials which are soluble in the electrolyte is the polarization of the anode material by contact with the cathode material dissolved or otherwise present in the electrolyte. This problem has caused substantial difficulty in the development of a satisfactory battery system using an organic material as the depolarizer (cathode), for many organic materials which have good electrochemical properties are substantially soluble in either their charged or discharged state in conventional battery electrolyte solutions.

It has been found that azodicarbonamide compounds, both substituted (U.S. Pat. No. 3,357,865) and unsubstituted, are useful depolarizer materials, and these compounds are particularly useful because they can be recharged after relatively deep discharges. These compounds are appreciably soluble in aqueous electrolyte solutions such as conventional LeClanche electrolytes, and therefore, selection of a suitable separator material is important. U.S. Pat. No. 3,357,865 discloses that satisfactory results may be obtained using conventional separators such as paper or cereal paste, but batteries using this type of separator provide only about 10 cycles of satisfactory performance. The patent also discloses that superior cycling capability can be achieved using a cellophane/paper laminated separator. Unfortunately, the cellophane/paper laminated separator does not have satisfactory high temperature or long duration storage capability, and batteries using this type of laminated separator do not provide performance which would be commercially acceptable after high temperature or long duration storage.

SUMMARY OF THE INVENTION

It is the general purpose of this invention to provide an electric battery having a laminated semipermeable barrier/absorbent separator which has improved cycle life and/or improved high temperature and long duration storage capability. In accordance with this invention, the absorbent material which is used as one layer of the laminated separator comprises a vinyl acetate-ethylene copolymer binder resin blended with a gelling agent such as a starch and flour mixture, carboxymethyl cellulose, methyl cellulose, polyacrylamides, natural gums and silica gel. The semi-permeable barrier layer comprises a microporous membrane prepared from cellophane or a microporous plastic film such as polyamide, polyester, polyolefin, polyvinyl chloride or polyacrylate. The semipermeable membrane and the absorbent material may be laminated together such as by means of an adhesive to form a unitary sheet capable of being handled and assembled into a battery container on automatic battery manufacturing machinery.

The electric batteries of this invention generally comprise a cathode and an anode separated by the laminated separator, and an aqueous electrolyte. The laminated separator is placed in the battery in such a manner that the semipermeable barrier is adjacent to the cathode (depolarizer) mix, and the absorbent material is in contact with the anode. These laminated separators are particularly useful in combination with rechargeable organic depolarizers such as azodicarbonamide and the substituted azodicarbonamide compounds disclosed in U.S. Pat. No. 3,357,865.

BRIEF DESCRIPTION OF THE DRAWINGS

FIG. 1 is a vertical sectional view of an electric battery using a laminated separator in accordance with this invention; and FIG. 2 is a sectional schematic view illustrating the components of a laminated separator and their relationship to the battery electrodes.

DESCRIPTION OF THE PREFERRED EMBODIMENT

The electric battery of this invention comprises an anode, a cathode, a laminated semi-permeable barrier/absorbent separator between the anode and cathode, and an aqueous electrolyte. The anode active material may be selected from metals such as zinc, magnesium, aluminum or other electropositive metal, including mixtures or alloys thereof. Zinc or zinc alloys are generally the preferred anode material and may be used as cans or containers in a manner similar to those used in conventional flashlight batteries.

The cathode (depolarizer) material may comprise any suitable oxidizing agent, and the laminated separator is particularly useful with cathode materials which are appreciably soluble in the battery electrolyte. For example, the laminated separator is especially effective when used in combination with the recently developed azodicarbonamide depolarizers which may be generally represented by the following formula:

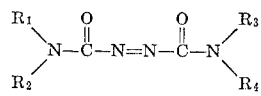

where $R_1$, $R_2$, $R_3$ and $R_4$ may be hydrogen, alkyl of 1 to to 8 carbon atoms, mono-dicarbocyclic aryl or substituted aryl, cycloalkyl, aralkyl, alkoxyalkyl, cyanoalkyl, haloalkyl, nitroalkyl, alkenyl, and where $R_1$ and $R_2$ and/or $R_3$ and $R_4$ when alkyl may be joined together through a nitrogen, sulfur or oxygen linkage to form a heterocyclic ring. Unsubstituted azodicarbonamide, when $R_1$, $R_2$, $R_3$, and $R_4$ are all hydrogen, is also useful as a cathode material, when used either alone or in combination with substituted azodicarbonamide compounds. The preferred azodicarbonamide compounds are those in which the nitrogen atoms carry an alkyl radical of 1 to 4 carbon atoms. As disclosed in U.S. Pat. No. 3,357,865, it is possible to use the corresponding substituted or unsubstituted biurea. The azodicarbonamide compounds may be present in the cathode mix in amounts ranging from about 10 to about 30% by weight of the total wet mix. The cathode mix may also contain electrolyte solution and highly conductive carbon, such as graphite, acetylene black or other high surface area carbon blacks.

Any suitable aqueous electrolyte solution may be used, and of course, the particular anode and cathode active materials will determine the proper electrolyte. The electrolyte solution may be acid, alkaline, or of the sea water type. When using an azodicarbonamide depolarizer, the electrolyte generally comprises an aqueous solution containing a halide salt, such as standard LeClanche electrolyte.

The principal object of this invention is to provide an electric battery having improved cycle life and/or improved high temperature and long duration storage capability, particularly batteries employing a cathode material which is appreciably soluble in the electrolyte. This object is accomplished by using a laminated semi-permeable barrier/absorbent separator in which the absorbent material comprises a vinyl acetate-ethylene copolymer binder resin blended with a gelling agent. The semi-permeable membrane is placed adjacent to the cathode material and acts as a barrier to prevent the cathode active material from migrating through the electrolyte into contact with the anode. The absorbent material is placed into contact with the anode so as to thoroughly and uniformly wet the anode surface with electrolyte absorbed by the gelling agent.

The semipermeable membrane may be selected from any microporous, film-forming resin which is resistant to hydrolysis by the electrolyte. In general it is preferred that the semipermeable membrane have a micropore size ranging from about 5 to about 50 angstroms. Cellophane has been found to be a particularly effective barrier material, though other microporous films such as polyamide, polyester, polyolefin, polyvinyl chloride, polyvinyl acetate or polyacrylate, may be used.

The absorbent material is specially prepared from a vinyl acetate-ethylene copolymer resin binder blended with a gelling agent. The vinyl acetate-ethylene copolymer has been found to be stable in the presence of aqueous electrolyte solutions (e.g. LeClanche electrolyte) even at elevated temperatures (113° F.). In addition, the vinyl acetate-ethylene copolymer can be loaded with exceptionally large amounts of gelling agent and still be formed into a uniform, thin sheet material which is free of holes. The gelling agent, which is essential because of its ability to absorb electrolyte and hold it in contact with the anode surface, may be selected from starch, flour, methyl cellulose, carboxymethyl cellulose, polyacrylamide resins, natural gums such as gum arabic, inorganic gelling agents such as silica gel, and admixtures thereof.

The vinyl acetate-ethylene copolymer/gelling agent composition may be manufactured into self-supporting films which have good strength characteristics. These films generally have thicknesses ranging from about 3 to about 15 mils, for films having a thickness greater than 15 mils cause higher internal resistance within the battery and loss of capacity. In general, the binder resin should be present in amounts ranging from about 10 to about 30% by weight of the total binder/gelling agent composition in order to form a continuous matrix for the gelling agent which comprises the balance.

It is essential that the vinyl acetate-ethylene copolymer be blended with the gelling agent in such a manner that the gelling agent is not gelled, and therefore, a dry blending procedure is generally preferred. The vinyl acetate-ethylene copolymer may be dry blended with the gelling agent under heat and agitation, such as in a Banbury mixer, to form a homogeneous mixture. The following composition is typical of the vinyl acetate-ethylene copolymer/gelling agent mixes:

| Ingredient: | Amount (pts. by wt.) |
|---|---|
| Vinyl acetate-ethylene copolymer (Elvax 260) | 20 |
| Vinyl acetate-ethylene copolymer (Elvax 150) | 5 |
| Wheat flour (Gold Medal all-purpose flour) | 150 |
| Corn starch | 75 |

After dry blending the powdered ethylene-vinyl acetate copolymer (Elvax) with the gelling agent in appropriate proportions, the mixture is sprinkled between the heated rolls (100° C.) of a mill to form a film of about 5 mils in thickness.

An important feature of the manufacturing process is that the vinyl acetate-ethylene copolymer and the gelling agent are blended in such a manner that the gelling agent is not gelled. In this manner, the gelling agent does not gel until it is contacted by the battery electrolyte.

Conventional laminating techniques can be used to prepare the laminated semipermeable barrier/absorbent separators. A laminating adhesive, which may comprise an aqueous solution of a colloid-forming material such as gum arabic, may be applied to either the semipermeable membrane or the absorbent material, though it is generally preferred to apply it to the stronger semipermeable membrane which also helps to avoid masking the gelling agent. After application of the adhesive, the other component is applied thereto to form a laminate which may then be passed through a drier to dry the adhesive, though air drying at room temperature is generally sufficient. Alternatively, the barrier and absorbent layers may be laminated together by treating one or both layers with a solution to tackify the layer, after which the layers may be laminated together. This procedure is difficult to carry out, for the layers tend to wrinkle after they are laminated and dried.

An alternate procedure for preparing the laminated separator comprises dissolving the vinyl acetate-ethylene copolymer in a solvent such as trichloroethylene and adding the gelling agent (wheat flour/cornstarch mixture) to the resin solution. This mixture is mixed for about 24 hours to form a viscous liquid which is cast on a wetted cellophane sheet by feeding it through an aperture or extrusion die of controlled thickness. During the casting operation, it is important that the wetted cellophane be restrained from shrinking which is accomplished by maintaining the cellophane sheet under tension. The laminated sheet is heated to evaporate the solvent from the absorbent layer and the water from the wetted cellophane. The dried laminated sheet is calendered to an acceptable density and thickness, generally ranging from about 4 to about 18 mils when using a 1 to 3 mil cellophane sheet.

Referring to the drawings, FIG. 1 illustrates a dry cell battery 10 using laminated semipermeable barrier/absorbent separator in accordance with this invention. This particular construction was designed for the recently developed azodicarbonamide organic depolarizer, but it should be noted that the use of the laminated separators of this invention is not limited to this type of construction. The battery 10 comprises a zinc anode 11 which also functions as a container for the cathode (depolarizer) mix 12, which is separated from the anode 11 by a plastic bottom cup 13 and a laminated separator 14 with an absorbent material layer 15 comprising a vinyl acetate-ethylene copolymer/gelling agent mixture in contact with the zinc anode 11 and a semi-permeable membrane 16 comprising cellophane in contact with the cathode 12. The cathode mix 12 may comprise a mixture of a depolarizer such as dibutyl azodicarbonamide, conductive carbon particles and electrolyte such as a standard LeClanche electrolyte (ammonium chloride/zinc chloride aqueous solution).

The relationship of the separator layers to the anode and cathode is shown more clearly in FIG. 2. The elements are numbered as in FIG. 1 with the exception of the laminating adhesive 17 which is not shown in FIG. 1. The laminating adhesive may comprise an aqueous solution of 20% gum arabic and 10% glycerine.

Returning to FIG. 1, the zinc anode 11 is in contact with a metallic bottom disk 18 which serves as the negative terminal. Both the bottom disk 18 and the zinc anode 11 are electrically insulated from the outer steel jacket 19 by a paper tube 20. The cathode mix 12 has a carbon pencil 21 inserted therein, and the carbon pencil 21 serves as a current collector and is in contact with the metallic cap 22 which serves as both the positive terminal and the top closure of the battery. After the carbon pencil 21 is inserted into the cathode mix 12, a plastic or paper compression washer 23 having a hole therein to receive the carbon pencil, is placed on the top surface of the cathode mix 12. The top edge of the zinc anode 11 is rolled inwardly to form a ledge or surface for supporting a plastic or paper seal washer 24 in such a manner as to provide an air space 25 between the seal washer 24 and the compression washer 25. Before placing the seal washer 24, a plastic sleeve 26 is placed over the carbon pencil 21 which is covered by the plastic sleeve throughout the air space 25. After the seal washer 24 is in place, it is covered by a softened asphaltic sealing composition 27 on top of which is placed a paper vent washer 28. Then the battery is closed by placing the metallic cap 22 over the carbon pencil 21 and the vent washer 28, and the top edge of the steel jacket 19 and the paper tube 20 is crimped over the edge of the cap 22.

The following examples illustrate the superior cycle life and the improved high temperature and long duration storage capability of batteries using a laminated semi-permeable barrier/absorbent separator in accordance with this invention.

Example I

Electric batteries of the "AA" size having a construction similar to that illustrated in FIG. 1 were tested for cycle life with the sole variable being the separator. The anode material was zinc, the cathode mix contained dibutyl azodicarbonamide as the depolarizer, and the electrolyte was a conventional LeClanche electrolyte (ammonium chloride/zinc chloride aqueous solution). 3 batteries were tested using an absorbent material comprising 10% by weight of a vinyl acetate-ethylene copolymer (Elvax) and 90% by weight of a starch/wheat flour mixture (as set forth in col. 6) laminated to cellophane (PUDO 193) as the separator (E-C). 1 battery was tested using the same cellophane (PUDO 193) as the semipermeable barrier and alpha-cellulose paper as the absorbent material (P-C).

The cycle regimen comprised discharging the batteries through a 5.1 ohm load for 1 hour and recharging with 1.70 volts through 10 ohms for 7 hours. The batteries were tested to determine the milliampere hours (ma. h.) delivered to a 0.8 volt cut-off. The following test results were recorded:

|  | Ma H to 0.8 volt | |
|---|---|---|
|  | E-C (avg. 3) | P-C |
| Cycle No.: |  |  |
| 1 | 152 | 154 |
| 37 | 147 | 153 |
| 49 | 136 | 132 |
| 64 | 147 | 46 |
| 79 | 145 | 6 |
| 106 | 142 |  |
| 121 | 134 |  |
| 148 | 115 |  |
| 253 | 70 |  |

These test results clearly demonstrate the improved cycle life obtained using a vinyl acetate-ethylene copolymer/starch-flour gelling agent as the absorbent material.

Example II

Batteries identical to those tested in Example I were also tested for their high temperature storage capability. These batteries were stored at 113° F. and were tested monthly for 3 months to determine their impedance and capacity which was compared to their theoretical capacity (182 milliampere-hours) for "AA" batteries) and reported as percent efficiency. After storage, these batteries were recharged prior to their discharge through a 5.1 ohm load to a 0.8 volt cut-off. The following test results were recorded:

|  | Initial | | | 1 month | | | 2 month | | | 3 month | | |
|---|---|---|---|---|---|---|---|---|---|---|---|---|
| Separator | Amperes | Improvement | Percent efficiency | Amperes | Improvement | Percent efficiency | Amperes | Improvement | Percent efficiency | Amperes | Improvement | Percent efficiency |
| P-C | 4.1 | 0.4 | 84 | 2.0 | 0.7 | 63 | 0.2 | 15.0 | 30 | 0.1 | 32 | 0 |
| E-C | 4.5 | 1.0 | 89 | 2.5 | 2.5 | 82 | 1.8 | 2.5 | 71 | 1.4 | 32 | 56 |

The improvement in high temperature storage capability provided by the cellophane barrier and the vinyl acetate-ethylene copolymer/gelling agent separator is apparent.

Example III

Batteries similar to those tested in Examples I and II but of the "D" size were tested for their room temperature (70° F.) long duration storage capability. These batteries were tested after 3 and 6 month storage periods to determine their impedance and capacity which was compared to their theoretical capacity (1250 milliampere-hours for "D" batteries) and reported as percent efficiency. After storage, these batteries were recharged prior to their discharge through a 2.2 ohm load to a 0.8 volt cut-off. The following test results were recorded:

|  | Initial | | | 3 month | | | 6 month | | |
|---|---|---|---|---|---|---|---|---|---|
| Separator | Amperes | Improvement | Percent efficiency | Amperes | Improvement | Percent efficiency | Amperes | Improvement | Percent efficiency |
| P-C | 5.3 | 0.3 | 85 | 3.8 | 0.6 | 72 | 2.0 | 0.8 | 57 |
| E-C | 5.3 | 0.4 | 85 | 4.6 | 0.5 | 73 | 3.9 | 0.4 | 77 |

The batteries with the cellophane barrier and the Elvax resin-starch/flour absorbent material had significantly better storage capability.

Having completely described this invention, what is claimed is:

1. An electric battery having an anode, an aqueous electrolyte solution, a cathode appreciably soluble in the electrolyte and a separator between the anode and cathode, said separator comprising a semipermeable membrane barrier material laminated to an absorbent sheet material consisting essentially of a vinyl acetate-ethylene copolymer resin binder blended with a gelling agent capable of absorbing and retaining the aqueous electrolyte solution, said vinyl acetate-ethylene copolymer forming a continuous matrix and comprising from about 10 to about 30% by weight of the absorbent sheet material, said semi-permeable membrane being in contact with said cathode and said absorbent sheet material being in contact with said anode.

2. A battery in accordance with claim 1 in which the semipermeable membrane is cellophane.

3. A battery in accordance with claim 1 in which the semipermeable membrane is cellophane and the gelling agent is a mixture of starch and flour.

4. A battery in accordance with claim 1 in which the cathode comprises an azodicarbonamide compound as the depolarizer.

5. A battery in accordance with claim 4 in which the anode is zinc.

6. A battery in accordance with claim 5 in which the semipermeable membrane is cellophane.

7. A battery in accordance with claim 5 in which the semipermeable membrane is cellophane and the gelling agent is a mixture of starch and flour.

8. A battery in accordance with claim 7 in which the depolarizer is dibutyl azodicarbonamide.

9. An electric battery having an anode, an aqueous electrolyte solution, a cathode composition in which an azodicarbonamide compound is the depolarizer and a separator between the anode and cathode, said separator comprising a semipermeable barrier material laminated to an absorbent sheet material consisting essentially of a vinyl acetate-ethylene copolymer resin binder blended with a gelling agent capable of absorbing and retaining the aqueous electrolyte solution, said vinyl acetate-ethylene copolymer forming a continuous matrix and comprising from about 10 to about 30% by weight of the absorbent sheet material, said semipermeable membrane being in contact with said cathode, said absorbent sheet material being in contact with said anode, and said laminated semipermeable membrane/absorbent sheet separator having a total thickness ranging from about 4 to about 18 mils.

10. A battery in accordance with claim 9 in which the semipermeable barrier is cellophane having a thickness ranging from about 1 to about 3 mils.

11. A battery in accordance with claim 9 in which the absorbent sheet material has a thickness ranging from about 3 to about 15 mils.

References Cited

UNITED STATES PATENTS

| | | | |
|---|---|---|---|
| 2,836,644 | 5/1958 | Morehouse et al. | 136—137 |
| 2,923,757 | 2/1960 | Klopp | 136—146X |
| 3,023,259 | 2/1962 | Coler et al. | 136—137X |
| 3,048,647 | 8/1962 | Korver et al. | 136—157X |
| 3,357,865 | 12/1967 | Davis et al. | 136—137 |
| 3,463,669 | 8/1969 | Jammet | 136—146X |

DONALD L. WALTON, Primary Examiner

U.S. Cl. X.R.

136—137, 145, 146